United States Patent [19]

Van Laethem et al.

[11] 4,349,369
[45] Sep. 14, 1982

[54] PROCESS FOR COATING GLASS

[75] Inventors: Robert Van Laethem, Loverval; Albert Van Cauter, Charleroi; Robert Terneu, Thiméon, all of Belgium

[73] Assignee: BFG Glassgroup, Paris, France

[21] Appl. No.: 228,232

[22] Filed: Jan. 26, 1981

[30] Foreign Application Priority Data

Jan. 31, 1980 [GB] United Kingdom ............... 8003382

[51] Int. Cl.³ .................... C03C 17/00; C03C 17/10; C03C 17/25
[52] U.S. Cl. .................................. 65/60.4; 65/60.5; 65/60.51; 65/60.52; 427/110; 427/160; 427/168
[58] Field of Search ............ 427/160, 168, 110; 65/60.4, 60.5, 60.51, 60.52

[56] References Cited

FOREIGN PATENT DOCUMENTS 1516032 6/1978 United Kingdom .
1523991 9/1978 United Kingdom .

Primary Examiner—James R. Hoffman
Attorney, Agent, or Firm—Spencer & Kaye

[57] ABSTRACT

In the formation of a metal or metal compound coating on a face of a heated glass substrate during its forward displacement by contacting such face, at a coating station with at least one stream of droplets comprising one or more substances from which said coating is formed there is a problem in forming uniform high quality coatings which are free from structural defects.

To help reduce this problem, the stream(s) of droplets (e.g. from spray gun 20) is or are repeatedly displaced along a transverse path (defined by guide 15) across the substrate (4), and gas is propelled (e.g. from discharge nozzles 24) unidirectionally forwardly or rearwardly across said transverse path, out of line with the droplet stream(s).

20 Claims, 4 Drawing Figures

PROCESS FOR COATING GLASS

BACKGROUND OF THE INVENTION

This invention relates to a process of forming a metal or metal compound coating on a face of a heated glass substrate during its displacement in a given direction by contacting such face at a coating station through which the substrate passes, with at least one stream of droplets comprising a substance or substances from which said coating metal or metal compound is formed on said face. The invention also relates to apparatus for use in carrying out such a process.

Such a process can be employed for coating glass sheets and for coating a continuous freshly formed ribbon of flat glass. The process can be used for forming coatings, e.g. metal oxide coatings, which modify the apparent colour of the glass and/or which have some other required properties in respect of incident radiation, e.g. an infra-red-reflecting property.

Problems are encountered in forming coatings which have uniform properties. This is partly due to the difficulty of ensuring uniformity of the structure and thickness of the coating from one zone to another.

Various proposals have been made for promoting the formation of uniform coatings, including the discharge of the coating material as a stream which is inclined downwardly towards the substrate in the direction of its conveyance, and the creation of suction forces in exhaust ducting situated so as to cause gases environmental to the droplet stream to flow away from such stream and into such ducting (cf. United Kingdom Pat. Nos. 1 516 032 and 1 523 991).

Even when observing conditions hitherto proposed in this art, defects sometimes occur within or at the surface of the coating. These defects although often not prominent, nevertheless disqualify the product from the top quality ratings which are now in demand. If the defects are at the surface of the coating, the quality of the product can in some but not all cases be improved by an after-coating surfacing treatment, but of course such additional treatments add to the product costs.

SUMMARY OF THE INVENTION

The present invention provides a process wherein the environment at the coating station is acted on in a manner which has been found to be helpful in reducing the occurrence of structural defects in the coating and enabling high quality coatings to be more easily and reliably produced.

According to the present invention, a process of forming a metal or metal compound coating on a face of a heated glass substrate during its displacement in a given direction (hereafter called "forwardly") by contacting such face, at a coating station through which the substrate passes, with at least one stream of droplets comprising a substance or substances from which said coating metal or metal compound is formed on said face, is characterised in that said stream(s) of droplets is or are repeatedly displaced along a transverse path across the substrate, and in that gas is propelled unidirectionally forwardly or rearwardly across said transverse path, out of line with the droplet stream(s).

To simplify the following part of this specification, mainly a single droplet stream will be referred to. But two or more, e.g. two more formed side by side, can be employed.

Experiments indicate that the process according to the invention is less liable to form coatings giving rise to internal light diffusion. It is believed that such faults can result from the interception and entrainment by the droplet stream of vapour phase reaction products collecting in the environment of the substrate and that the improvement resulting from the process according to the invention is due at least in part to the scavenging of such reaction products from the path of the droplet stream by the said gas.

In preferred processes according to the invention the droplet stream is displaced to and fro along said path across the substrate and the discharging of said stream occurs continuously during such to and fro movements. The process is in such circumstances easier to perform.

Preferably the propelled gas is drawn from a source extraneous to the normal environment above the substrate. The choice of the gas can be made having regard to the composition of the droplets and the composition of the coating to be formed on the substrate so that the gas does not give rise to any undesirable chemical reactions. Use can be made of an inert gas or a gas which promotes or participates in a chemical reaction required for the formation of the coating. As an alternative the propelled gas can be gas which is propelled from upstream or downstream of the coating station, forwardly or rearwardly along the substrate, by one or more fans or other blowing devices.

In certain processes according to the invention the said propulsion of gas takes place from an orifice or orifices which is or are stationary and is effected intermittently in timed relation to the movements of the droplet stream along its said transverse path so that the propelled gas does not encounter the droplet stream.

The said propulsion of gas can be effected intermittently (in out-of-phase relationship with the successive traversals of the substrate by the droplet stream) simultaneously from regions which are distributed across the path of the substrate so that the gas flows across all but the opposed marginal regions of the coated area of the substrate. Preferably however the transverse path of the droplet stream extends beyond the corresponding limits of the substrate area to be coated and gas is intermittently propelled simultaneously across all regions of said path between said limits. In that manner the entire face of the glass substrate can be coated.

In certain very advantageous processes according to the invention, the said propulsion of gas is effected continuously from (an) orifice(s) which is or are displaced across the path of the substrate, in tandem with the source of the droplet stream. Such processes afford the advantage that during each moment of the coating process the propelled gas can scavenge reaction products from the environment in the immediate vicinity of the droplet stream. Preferably in each displacement of the droplet stream across the substrate gas is propelled from a discharge orifice which follows the source of the droplet stream in such displacement whereby the passage of the stream through a given region along said path is followed by a flow of gas across that region. This procedure has been found to be the most effective.

Preferably the droplet stream is downwardly inclined towards the substrate. Generally speaking, the use of an inclined stream makes it easier to form coatings of homogeneous structure, particularly relatively thick coatings. Preferably the included angle between the axis of the droplet stream and the substrate face being coated is in the range 20° to 60° and most preferably in the range 25° to 35°. For obtaining the best results all parts of the droplet stream should be incident upon the substrate at a substantial inclination to the vertical. Accordingly, in the most preferred embodiments of the invention the droplet stream is a parallel stream or is one which diverges from its source at an angle of not more than 30°.

The droplet stream is preferably inclined downwardly and forwardly towards the substrate because this condition is most favourable for promoting the homogeneity of the coating structure. In an alternative embodiment of the invention, the droplet stream is downwardly and rearwardly inclined towards the substrate. This condition can also give good results in certain circumstances, for example for forming certain coatings when there is no strong natural draught current in the forward direction through the coating station.

The said propulsion of gas preferably takes place in the forward direction, i.e. in the direction of conveyance of the substrate. Normally natural draught currents flow through the coating station in the forward direction and environmental conditions favourable to the formation of high quality coatings can be more easily achieved by propelling the scavenging gas current(s) in the same direction.

In the most preferred embodiments of the invention, the droplet stream is downwardly and forwardly inclined towards the substrate and said propelled gas is also propelled forwardly.

Experiments indicate that uniform coatings can be more easily formed if certain conditions are observed with respect to the distance between the substrate face being coated and the source of the droplet stream. Preferably such distance, measured normally to the substrate face, is from 15 to 35 cm. This has been found to be the most suitable range, particularly when observing the preferred inclination and divergency ranges for the droplet stream above referred to.

The invention is very suitable for use in coating a continuous ribbon of flat glass travelling from a flat glass forming plant. The invention includes processes wherein the substrate is a continuous ribbon of float glass travelling from a float tank.

In certain such applications of the invention the droplet stream impinges on the top face of a freshly formed ribbon of flat glass at a position where the temperature of the glass is within the range 650° C. to 100° C.

The process according to the invention can be applied for forming various oxide coatings by employing a liquid composition containing a metal salt. The cleaning of the environment of the substrate face being coated makes it possible to achieve good quality coatings starting with solutions which give off reactive vapours. Very advantageous processes according to the invention include processes wherein the droplets are droplets of a solution of a metal chloride from which a metal oxide coating forms on the substrate. In some processes the said solution is a tin chloride solution, e.g. an aqueous or non-aqueous medium containing stannic chloride and a doping agent, e.g. a substance providing ions of antimony, arsenic or fluorine. The metal salt can be employed together with a reducing agent, e.g. phenyl hydrazine, formaldehyde, alcohols and non-carbonaceous reducing agents such as hyroxylamine, and hydrogen. Other tin salts may be used in place of or in addition to stannic chloride, e.g., stannous oxalate or stannous bromide. Examples of other metal oxide coatings which can be formed in a similar manner include oxides of cadmium, magnesium and tungsten. For forming such coatings the coating composition can likewise be prepared by forming an aqueous or organic solution of a compound of the metal and a reducing agent. Solutions of nitrates can be employed, for example iron and indium nitrates, for forming coatings of the corresponding metal oxides. As a further example the invention can be employed for forming coatings by pyrolysis of organometallic compounds, e.g. carbonyls and metal acetylacetonates supplied in droplet form to the substrate face to be coated. Also certain metal acetates can be used, e.g. tin dibutyl diacetate and titanium isopropylate. It is within the scope of the invention to apply a composition containing salts of different metals so as to form a coating containing a mixture of different metals or metal compounds.

A coating formed by a process according to the invention may in certain circumstances possess a surface which has local structural faults, e.g. a surface which is uneven due to spurious deposits. Such defects can be removed by a surfacing treatment performed after formation of the coating. For example the surface of the coating can be subjected to an abrasion treatment.

The formation of spurious surface deposits can be avoided or reduced by creating suction forces downstream from the coating zone. Accordingly, in certain embodiments of the invention, suction forces are created in exhaust ducting to draw gases environmental to the droplet stream continuously away from the said transverse path of the droplet stream, in the same direction (forwardly or rearwardly) along the substrate as that in which gas is propelled across said path. Such suction forces are of course controlled so that they do not disrupt or appreciably disturb the droplet stream. Such processes may combine performance of the present invention and the invention which is the subject of United Kingdom Pat. No. 1 523 991.

The invention includes apparatus suitable for use in forming a metal or metal compound coating on heated glass substrate by a process according to the invention as hereinbefore defined. Apparatus according to the present invention comprises means for conveying a heated substrate in a given direction (hereafter called "forwardly") through a coating station, and spraying means at that station for discharging at least one stream of droplets onto the moving substrate, characterised in that there is driving mechanism for displacing said spraying means to cause said droplet stream(s) repeatedly to travel along a path transverse to said forward direction and in that there is means for propelling gas unidirectionally forwardly or rearwardly so that such gas flows across that path, out of line with the droplet stream(s).

Apparatus according to the invention may include any additional feature or features which may be required for making use of any one or more of the various optional process features hereinbefore described.

Preferably the spraying means is located in a tunnel through which the heated substrate is conveyed by said conveying means. Preferably the gas propelling means draws the propelled gas from a source outside the said tunnel.

In certain embodiments of the apparatus there is a fixed orifice or a fixed series of orifices extending transversely across the substrate path and the gas propelling means operates to propel gas intermittently from such orifice(s) in out-of-phase relationship with the displacements of said spraying means across the substrate.

In other apparatus according to the invention there is an orifice or orifices which is or are displaceable transversely across the ribbon path, in tandem with the source(s) of said droplet stream(s), and said gas propelling means operates to propel gas continuously from such orifice(s). Preferably the driving mechanism operates to displace the spraying means to and fro transversely across the substrate path together with leading and trailing gas discharge orifices and the gas propelling means operates to discharge gas through said orifices in alternation thereby to cause the passage of a droplet stream through a given region along its said transverse path to be followed by flow of gas across that region.

Preference is given to apparatus wherein the spraying means is arranged to discharge said droplet stream(s) at a downward inclination, and most preferably at a forward and downward inclination, onto the substrate. Preferably the spraying means directs at least one said stream so that the included angle between the axis of the droplet stream and the plane of the substrate during its said conveyance is in the range 25°–35° C. Preferably the spraying means is constructed to discharge at least one said droplet stream which is a parallel stream or which diverges from its source at an angle of not more than 30°, as hereinbefore referred to. Preferably the gas propelling means is arranged to propel gas in the forward direction.

The invention includes apparatus as above defined, installed in association with a flat glass forming plant, e.g. a float tank, for coating a continuous ribbon of glass travelling from that plant. Advantageously, the spraying means is arranged so that at least one said stream of droplets impinges on the top face of the ribbon at a zone where the temperature of the glass is within the range 650° to 100° C.

In some apparatus according to the invention there is gas exhaust means comprising exhaust ducting located for drawing gases away from said transverse path, in the same direction (forwardly or rearwardly) along the substrate as that in which said gas propelling means propels gas across such path.

BRIEF DESCRIPTION OF THE DRAWING

Certain embodiments of the invention, selected by way of example, are illustrated in the accompanying diagrammatic drawings in which.

DESCRIPTION OF THE PREFERRED EMBODIMENTS

Figure 1:
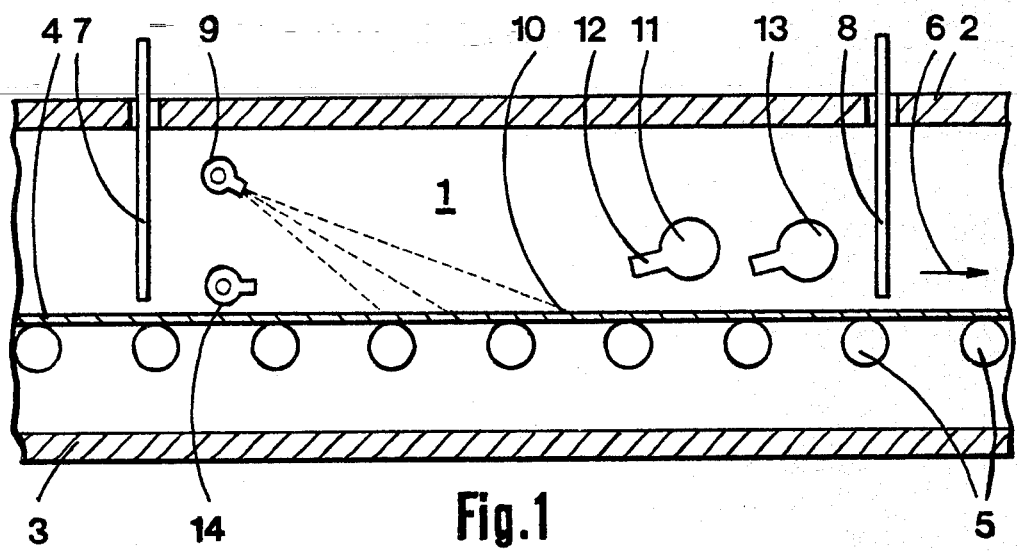
FIG. 1 is a cross-sectional side elevation of part of a flat glass manufacturing plant incorporating coating apparatus according to the invention.

Referring to FIG. 1, the coating apparatus is located in an annealing tunnel or lehr 1 having a roof wall 2 and a sole wall 3. A glass ribbon 4 is conveyed through the lehr from a ribbon forming section of the plant. The annealing lehr may for example be associated with a Libbey-Owens type sheet glass drawing machine, or it may be associated with a float tank in which the glass ribbon is formed by the float process.

The glass ribbon 4 is supported by rollers 5 and travels forwardly through lehr 1, in the direction indicated by arrow 6. Above the path of the glass ribbon there are displaceable refractory screens 7 and 8 which define between them a compartment in which a metal compound coating is formed on the upper face of the glass ribbon as it travels through the lehr.

At a coating station in said compartment a spray gun 9 is mounted above the horizontal path of the glass ribbon. The spray gun is connected to mechanism (not shown) for displacing such gun to and fro along a horizontal path normal to the direction of the ribbon displacement. The vertical distance between the spray gun and the top of the glass ribbon is from 15 to 35 cm. The spray gun is orientated so that droplets are discharged in a steady conical stream which is inclined forwardly and downwardly onto the glass ribbon. The axis of the stream is inclined to the ribbon at an angle of from 25° to 35°, the cone angle being 20°.

At a distance of the order of 10 to 30 cm downstream from the downstream boundary 10 of the zone of impingement of the droplet stream on the glass ribbon, there is an exhaust duct 11 which is connected to means (not shown) for maintaining suction forces in the duct. The duct extends transversely across the ribbon path and has a nozzle 12 defining a slot-like gas inlet passage. The entry orifice of the nozzle is at a height of from 1 cm to 20 cm above the glass ribbon.

Suction forces are created continuously in duct 11 when the apparatus is in use to cause gases in the environment of the droplet stream to flow forwardly away from said stream and from the vicinity of the impingement zone and into such duct. The suction forces are adjusted so that they do not disturb the steadiness of the droplet stream. The exertion of such suction forces reduces the risk of spurious surface deposits on the formed coating, as hereinbefore referred to.

In the particular illustrated embodiment of apparatus, a second exhaust duct 13 is provided which is spaced downstream from the duct 11. The second exhaust duct draws off gases which flow downstream past duct 11.

At a position vertically below the spray gun and at a distance of 1 to 2 cm from the glass ribbon there is a gas discharge tube 14 which extends transversely across the ribbon path. This tube has a series of small, closely spaced discharge orifices distributed along its length and located so that gas delivered into the tube under pressure discharges forwardly from those orifices parallel with the ribbon of glass. Discharge of gas, e.g. hot-compressed air, from the tube 14 is effected intermittently. A discharge occurs each time the spray gun reaches the end of a transverse across the glass ribbon. Consequently the gas currents act along the tunnel, out of line with the stream of droplets from the spray gun. The gas discharging from the tube 14 flows forwardly across the transverse path of movement of the spray and comes under the influence of the aspirating forces in the exhaust ducts 11 and 13. The structure of the coating formed on the glass ribbon is thereby improved, the coating being free from internal base.

Figure 2:
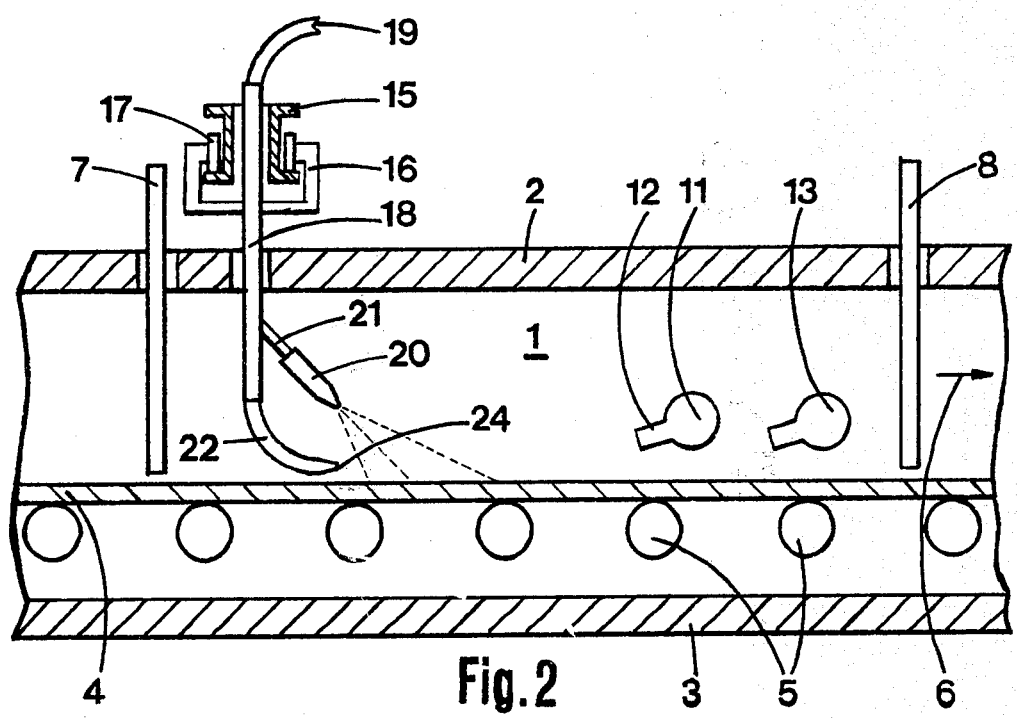
FIG. 2 is an identical view of the plant with a modified coating apparatus.
Figure 3:
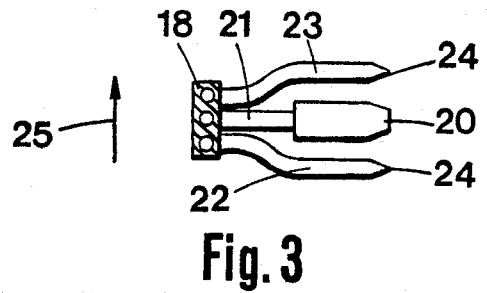
FIG. 3 shows in plan view a detail of the coating apparatus shown in FIG. 2.

In the modified coating apparatus shown in FIGS. 2 and 3, in which the same numerals as in FIG. 1 are used to denote the same parts of the apparatus, there is a fixed transverse guide 15 along which a carriage 16 is mounted. The carriage has rollers 17 which run along flanges of the said guide. The carriage supports a vertical tube 18 within which there are several conduits for compressed air and solution to be sprayed. The air and solution are fed via flexible conduits, one of which, designated 19, appears in FIG. 2. Separate streams of hot air and solution are fed to a spray gun 20 via a branch 21 from the tube 18. Further streams of hot air flow further downwardly along the interior of tube 18 and issue from a pair of discharge tubes 22 and 23 having discharge nozzles 24 at their extremities. The flexible feed conduits for feeding compressed air to those passageways within tube 18 which are connected to the tubes 22 and 23 have control valves (not shown) which during transverse to and fro motion of the carriage 16 are operated to cause hot compressed air from a source (not shown) to discharge through the tubes 22 and 23 alternately. While the carriage is travelling in the direction of the arrow 25 in FIG. 3 hot air is discharged from the tube 22, discharge from the tube 23 being blocked. During travel of the carriage in the opposite direction across the ribbon hot air discharges only from tube 23. Each region along the path of the droplet stream across the ribbon of glass is therefore swept by a gas current travelling in the downstream direction immediately after the droplet stream has past that region. The gas currents created in the environment of the ribbon by the discharge from the tubes 22 and 23 do not disturb the trajectories of the droplets from the spray gun, notwithstanding that such currents sweep across the transverse path of movement of the droplet stream.

The coating apparatus shown in the FIGS. 1 and 2-3 can also be used, without modification, for coating a glass substrate while it is conveyed through the coating station in the opposite direction to arrow 6. Good results can also be obtained in that manner in certain circumstances, e.g. in plant in which there are no strong natural draught currents flowing through the coating station in the direction of movement of the substrate. But the coating quality obtainable by the illustrated procedure is generally better, particularly when forming thick coatings.

Figure 4:
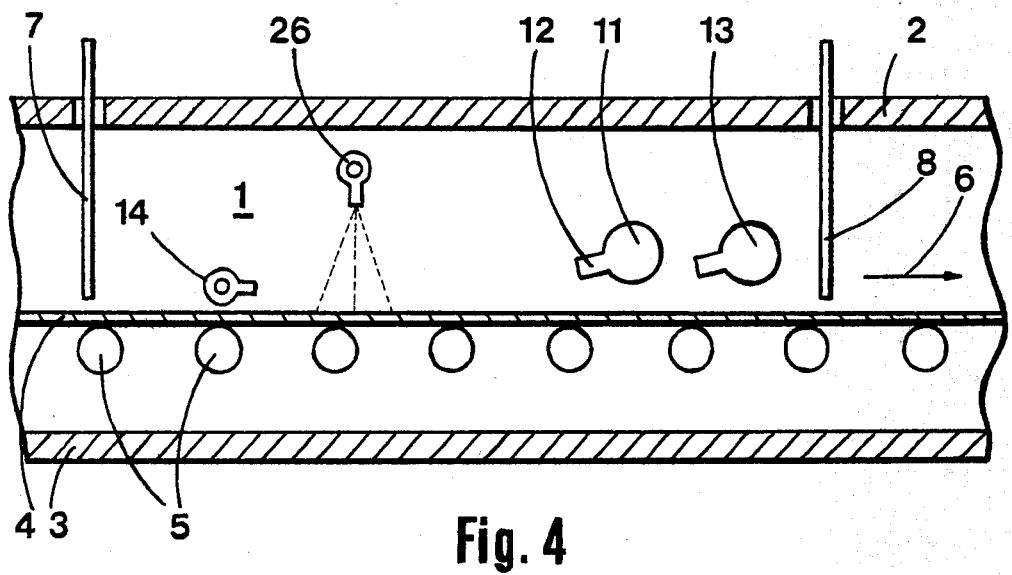
FIG. 4 is a cross-sectional side elevation of part of another plant incorporating coating apparatus according to the invention.

The apparatus shown in FIG. 4 corresponds with that shown in FIG. 1, except for the arrangement of the spraying means. In the apparatus shown in FIG. 4, the droplet stream is discharged from a spray gun 26 which is orientated vertically for discharging the droplet stream vertically towards the glass ribbon.

The following are example of processes according to the invention performed with the aid of apparatus as above described.

EXAMPLE 1

Coating apparatus as described with reference to FIG. 1 was employed for coating a ribbon of glass 3 meters in width in course of its production by a Libbey-Owens type drawing process, the speed of the glass ribbon being of the order of 1 meter per minute. The coating apparatus was installed at a position such that the temperature of the glass at a zone of impingement of the droplet stream was of the order of 600° C.

The spray gun was of a conventional type, and was operated at a pressure of the order of 4 kg/cm$^2$. The gun was displaced to and fro across the ribbon path at a height of 30 cm above the glass ribbon, so as to complete nine reciprocations per minute. The spray gun was directed so that the axis of the spray was at 30° to the plane of the glass ribbon.

The spray gun was fed with an aqueous solution of tin chloride obtained by dissolving hydrated tin chloride ($SnCl_2.2H_2O$) in water and adding a small quantity of $NH_4HF_2$.

The rate of delivery of the coating solution was adjusted to form on the glass ribbon a coating of tin oxide doped by fluorine ions and having a thickness of 7,500 Å.

Hot compressed air was intermittently discharged forwardly along the glass ribbon from the tube 14, in out-of-phase relationship with the transverse to and fro movements of the spray gun, thereby to accelerate the evacuation of vapours from the path of the droplet stream. The hot air was discharged for less than one second each time the spray gun reached the end of its course near a side edge of the glass ribbon.

The suction forces in the exhaust ducts 11 and 13 were adjusted to maintain a depression of the order of 100 mm of water in the suction nozzle of each of the ducts 11 and 13, which nozzles were 20 cm above the glass ribbon.

The tin oxide coating which was thus formed was found to be almost free from internal defects. In other terms, the coating was substantially free from causes of internal light deflection resulting in diffuse light transmission. It is supposed that this is because of the fact that the residual vapours or the decomposition products are not trapped within the spray in the successive passes thereof across the ribbon.

Instead of providing the tube 14 with a series of spaced gas discharge orifices distributed therealong, it could have a single slot-like discharge orifice.

In a modification of the foregoing process the spray gun was reciprocated at 6 cycles per minute and the spraying rate was adjusted to form a coating 10,000 Å in thickness.

Processes as above described can be used for example for coating a ribbon of float glass as it travels from the float tank.

In another application of the apparatus shown in FIG. 1 it was used for coating sheets of glass which were transported along the tunnel 1 in the opposite direction from narrow 6, all other conditions being as in the foregoing Example 1. The propulsion of gas from the tube 14 was also in that case found to be beneficial for reducing the occurrence of internal defects in the coating.

EXAMPLE 2

Apparatus as described with reference to FIGS. 2 and 3 was employed for coating a ribbon of glass having at the impingement zone of the droplets a temperature of the order of 580° C. The spray gun was supplied with a solution of the reaction product of anhydrous $SnCl_4$ with methanol. The concentration of the solution was adjusted by means of dimethylformamide after addition of HCl for stabilising the solution, and $NH_4HF_2$ as doping agent was added.

The suction forces were adjusted to maintain a depression of the order of 100 mm of water in the suction nozzles of the exhaust ducts 11 and 13. The delivery of the coating solution was regulated so that a coating of $SnO_2$ doped by fluorine ions and having a thickness of 7,200 Å was formed on the glass ribbon.

A jet of hot compressed air was discharged continuously either from tube 22 or tube 23 during each passage of the spray gun across the ribbon path during its to and fro motion. During each such passage of the spray gun the hot air discharged from that one of the tubes which trailed behind the gun. The transverse path of the droplet stream across the annealing lehr was thereby cleaned preparatory to the next displacement of the spray across the glass ribbon, so avoiding the entrapment of such vapours in the spray. Suction forces were maintained continuously in the ducts 11 and 13 as in Example 1.

As in Example 1, the coating of $SnO_2$ formed on the glass ribbon was found to be practically free of internal haze.

In a modification of the foregoing process, in which substantially identical results were obtained, the coating solution therein used was substituted by a solution obtained by reacting $SnCl_4$ with acetic anhydride in stoichiometric proportions, slowly agitating the resulting very syrupy brown-black liquid to allow escape of HCl, diluting the mixture with dimethylformamide and adding some cubic centimeters of a 40% by volume commercial solution of HF as doping agent.

EXAMPLE 3

A ribbon of float glass having a width of about 2.5 meters was coated as it travelled from the float tank, at a speed of 4.5 meters per minute, using a coating apparatus as represented in FIG. 1.

The spray gun was of conventional type and was operated under a pressure of the order of 3 kg/cm$^2$. The gun was mounted 25 cm above the glass ribbon and was pointed at an inclination of 30° to the ribbon plane. The gun was reciprocated at 10 cycles per minute. The gun was fed with a solution obtained by dissolving cobalt acetylacetonate $Co(C_5H_7O_2)_2.2H_2O$ in dimethylformamide. The gun was located so that this solution impinged on the glass ribbon at a position along its path where the glass had a temperature of the order of 580° C.

The suction nozzle 12 of the exhaust duct 11 was located 20 cm above the glass ribbon. The suction forces were adjusted so that a depression of the order of 50 mm of water was maintained in the said suction nozzle. The exhaust duct 13 was not employed.

The rate of discharge of the coating solution was adjusted so that a coating of cobalt oxide ($Co_3O_4$) having a thickness of the order of 920 Å formed on the glass.

Hot compressed air was discharged intermittently from tube 14. The hot air was discharged for less than one second on completion of each traverse of the glass ribbon by the spray gun. The amount of hot air emitted was regulated in such manner as to cause the residual vapours to be driven forwardly away from the transverse path of the droplet stream, towards the exhaust duct 11 in which suction forces were maintained continuously.

The coating formed on the glass ribbon had a brownish tint viewed in transmission and there was no trace of internal haze. In other terms, the coating possessed no internal defects causing diffusion of incident light.

The foregoing coating procedure can be followed for forming coloured layers composed of a mixture of oxides by feeding the spray gun with a solution containing a mixture of compounds of different metals e.g. compounds of metals selected from the group iron, cobalt, chromium and nickel, or by making use of a plurality of spray guns and feeding different solutions simultaneously through different guns.

We claim:

1. In a process of forming a metal or metal compound coating on a face of a heated glass substrate during its displacement in a given direction, constituting the forward direction of displacement, by contacting such face, at a coating station through which the substrate passes, with at least one stream of droplets composed of at least one substance from which the coating metal or metal compound is formed on the face, the improvement comprising repeatedly displacing said stream of droplets along a transverse path across the substrate, and propelling gas unidirectionally forwardly or rearwardly across said transverse path, out of line with said droplet stream.

2. A process according to claim 1, characterised in that the propelled gas is drawn from a source extraneous to the normal environment above the substrate.

3. A process according to claim 1 or 2, characterised in that the said step of propelling gas takes place from an orifice or orifices which is or are stationary and is effected intermittently in timed relation to the movements of the droplet stream along the said transverse path so that the propelled gas does not encounter the droplet stream.

4. A process according to claim 3, characterised in that the said transverse path of the droplet stream extends beyond the corresponding limits of the substrate area to be coated, and gas is intermittently propelled simultaneously across all regions of said path between said limits.

5. A process according to claim 1 or 2, characterised in that said step of propelling gas is effected continuously from an orifice or orifices which is or are displaced across the path of the substrate, in tandem with the source of the droplet stream.

6. A process according to claim 5, characterised in that in each displacement of the droplet stream across the substrate gas is propelled from a discharge orifice which follows the source of the droplet stream in such displacement so that the passage of the stream through a given region along said path is followed by a flow of gas across that region.

7. A process according to claim 1 or 2, characterised in that said step of propelling gas takes place to propel the gas in the forward direction.

8. A process according to claim 1 or 2, characterised in that the source of the droplet stream is at a distance, measured normally to the substrate face being coated, of from 15 to 35 cm.

9. A process according to claim 1 or 2 characterised in that the substrate is a continuous ribbon of flat glass travelling from a flat glass forming plant.

10. A process according to claim 9, characterised in that the substrate is a ribbon of float glass travelling from a float tank.

11. A process according to claim 9 characterised in that at least one said droplet stream impinges on the top face of the ribbon at a position where the temperature of the glass is within the range 650° to 100° C.

12. A process according to claim 1 or 2, characterised in that the droplets are droplets of a solution of a metal chloride from which a metal oxide coating forms on said substrate face.

13. A process according to claim 12, characterised in that said solution is a tin chloride solution.

14. A process according to claim 1 or 2, characterised in that suction forces are created in exhaust ducting to draw gases environmental to said droplet stream continuously away from the said transverse path of the droplet stream; in the same direction along the substrate as that in which gas is propelled across said path.

15. A process according to claim 1, characterised in that at least one said droplet stream is downwardly inclined towards the substrate.

16. A process according to claim 15, characterised in that the included angle between the axis of the droplet stream and the substrate face being coated is in the range of 20° to 60°.

17. A process according to claim 15 or 16, characterised in that use is made of at least one said droplet stream which is a parallel stream or which diverges from its sources at an angle of not more than 30°.

18. A process according to claim 15 or 16, characterised in that the droplet streams inclined downwardly and forwardly towards the substrate.

19. A process according to claim 18, characterised in that said step of propelling gas also takes place to propel the gas in the forward direction.

20. A process according to claim 16, characterised in that said included angle is in the range of 25° to 35°.

* * * * *